(12) United States Patent
Wang et al.

(10) Patent No.: US 10,887,853 B2
(45) Date of Patent: *Jan. 5, 2021

(54) METHOD AND DEVICE FOR SYNCHRONIZATION

(71) Applicant: Telefonaktiebolaget LM Ericsson (publ), Stockholm (SE)

(72) Inventors: Jianfeng Wang, Beijing (CN); Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,658

(22) Filed: Jun. 26, 2019

(65) Prior Publication Data

US 2019/0320399 A1 Oct. 17, 2019

Related U.S. Application Data

(63) Continuation of application No. 16/231,321, filed on Dec. 21, 2018, now Pat. No. 10,477,499, which is a
(Continued)

(30) Foreign Application Priority Data

Aug. 11, 2017 (WO) ................ PCT/CN2017/097282

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 56/005* (2013.01); *H04W 72/0446* (2013.01); *H04L 1/0071* (2013.01)

(58) Field of Classification Search
None
See application file for complete search history.

(56) References Cited

U.S. PATENT DOCUMENTS 10,477,499 B2 * 11/2019 Wang .................... H04L 5/0051
2011/0274102 A1 11/2011 Kim et al.
(Continued)

FOREIGN PATENT DOCUMENTS

CN 102547967 A 7/2012
CN 105210419 A 12/2015
(Continued)

OTHER PUBLICATIONS

Extended European Search Report for Application No. 18815098.1, dated Jun. 19, 2019, 5 pages.
Ericsson, "Timing Indication Based on SS Block," 3GPP TSG-RAN WG1 NR Ad-Hoc#2, R1-1711373, Jun. 27-30, 2017, 7 pages.
International Search Report and Written Opinion for Application No. PCT/CN2018/099850, dated Oct. 31, 2018, 9 pages.
Notice of Allowance from U.S. Appl. No. 16/231,321, dated Mar. 13, 2019, 12 pages.
(Continued)

*Primary Examiner* — Anh Vu H Ly
(74) *Attorney, Agent, or Firm* — NDWE LLP (57) ABSTRACT

A method for synchronization in a wireless system. In the method, a physical broadcast channel (PBCH) includes one or more bits, wherein the one or more bits indicate additional system information when a frequency of the wireless system is within a frequency range up to a predefined frequency and indicate a location of a slot group in a synchronization signal burst set when the frequency of the wireless system is above the predefined frequency, and wherein the slot group comprises at least one synchronization signal block and the synchronization signal burst set includes the slot group.

23 Claims, 4 Drawing Sheets

Related U.S. Application Data continuation of application No. PCT/CN2018/099850, filed on Aug. 10, 2018.

(51) Int. Cl.
*H04W 72/04* (2009.01)
*H04L 1/00* (2006.01)

(56) References Cited

U.S. PATENT DOCUMENTS

| | | | |
|---|---|---|---|
| 2016/0345118 A1 | 11/2016 | Oh | |
| 2017/0180095 A1 | 6/2017 | Xue et al. | |
| 2018/0279241 A1* | 9/2018 | Lee | H04L 5/0048 |
| 2018/0302182 A1 | 10/2018 | Ly et al. | |
| 2018/0302205 A1 | 10/2018 | Abedini et al. | |
| 2018/0323804 A1 | 11/2018 | Sadiq et al. | |
| 2018/0324023 A1 | 11/2018 | Zeng et al. | |
| 2018/0324678 A1 | 11/2018 | Chen et al. | |
| 2018/0359714 A1 | 12/2018 | Sadiq et al. | |
| 2019/0028315 A1 | 1/2019 | Park et al. | |
| 2019/0037481 A1 | 1/2019 | Zhang et al. | |
| 2019/0037508 A1 | 1/2019 | Sun et al. | |
| 2019/0037509 A1 | 1/2019 | Li et al. | |
| 2019/0149383 A1* | 5/2019 | Ko | H04L 27/2657 370/329 |
| 2020/0015182 A1* | 1/2020 | Yuan | H04W 76/27 |
| 2020/0154376 A1* | 5/2020 | Ko | H04W 72/005 |
| 2020/0162222 A1* | 5/2020 | Liu | H04L 5/0053 |

FOREIGN PATENT DOCUMENTS

| | | |
|---|---|---|
| RU | 2533664 C2 | 11/2014 |
| WO | 2010/082775 A2 | 7/2010 |
| WO | 2017028881 A1 | 2/2017 |

OTHER PUBLICATIONS

"RAN1 Chairman's Notes," 3GPP TSG RAN WG1 NR Ad-Hoc#2, Jun. 27-30, 2017, 77 pages.

Communication under Rule 71(3) EPC, EP App. No. 18815098.1, dated Feb. 10, 2020, 42 pages.

Decision to Grant, EP App. No. 18815098.1, dated Jun. 12, 2020, 2 pages.

Decision to Grant, RU App. No. 2019137568, dated Mar. 2, 2020, 12 pages (Original Document Only).

International Preliminary Report on Patentability, PCT App. No. PCT/CN2018/099850, dated Feb. 20, 2020, 5 pages.

NTT Docomo, Inc., "Discussion on NR-PBCH contents and payload size", 3GPP TSG RAN WG1 NR Ad-Hoc#2, R1-1711060, Qingdao, P.R. China, Jun. 27-30, 2017, 6 pages.

NTT Docomo, Inc., "Discussion on remaining details on NR-PBCH and PBCH-DMRS", 3GPP TSG RAN WG1 Meeting 90bis, R1-1718180, Prague, CZ, Oct. 9-13, 2017, 15 pages.

NTT Docomo, Inc., "Discussion on timing indication based on SS block for NR", 3GPP TSG RAN WG1 NR Ad-Hoc#2, R1-1711058, Qingdao, P.R. China Jun. 27-30, 2017, 11 pages.

Office Action, JP App. No. 2019-525908, dated Jan. 28, 2020, 5 pages.

European Search Report and Search Opinion, EP App. No. 20178443.6, dated Aug. 13, 2020, 8 pages.

First Office Action, CN App. No. 201880002803.7, dated Aug. 24, 2020, 10 pages (5 pages of English Translation and 5 pages of Original Document).

Interdigital Inc., "On SS Block Based Timing Indication in NR", 3GPP TSG RAN WG1 NR AH#2, R1-1710915, Jun. 27-30, 2017, 4 pages.

* cited by examiner

METHOD AND DEVICE FOR SYNCHRONIZATION

CROSS-REFERENCE TO RELATED APPLICATIONS

This application is a continuation of U.S. application Ser. No. 16/231,321, filed Dec. 21, 2018, which is a continuation of International Application No. PCT/CN2018/099850, filed Aug. 10, 2018, which claims the benefit of International Application No. PCT/CN2017/097282, filed Aug. 11, 2017, which are all hereby incorporated by reference.

TECHNICAL FIELD

The present disclosure relates generally to wireless communication technology, and in particular, to a method for synchronization in a wireless system and related device.

BACKGROUND

In order to connect to a network, a terminal device needs to acquire network synchronization information and obtain essential system information. Synchronization signals (SSs) are used for adjusting the frequency of the terminal device relative to the network, and for finding proper timing of the received signal from the network.

In the New Radio (NR) system, a procedure for synchronization and access may involve several signals as follows:

NR-Primary synchronization signal (NR-PSS) that allows for network detection in the presence of a high initial frequency error, up to tens of ppm. Additionally, NR-PSS provides a network timing reference. 3GPP has selected Zadoff-Chu sequences as PSS signals in a Long Term Evolution (LTE) system and m-sequence in the NR system.

NR-Secondary synchronization signal (NR-SSS) that allows for more accurate frequency adjustments and channel estimation while at the same time providing fundamental network information, e.g. cell identifier (ID).

NR-Physical broadcast channel (NR-PBCH) that provides a subset of minimum system information. It will also provide timing information within a cell, e.g. to separate timing between beams transmitted from a cell. The amount of information to fit into the NR-PBCH is of course highly limited to keep the size down. Furthermore, demodulation reference signals (DMRS) are interleaved with NR-PBCH resources in order to receive.

Figure 1:
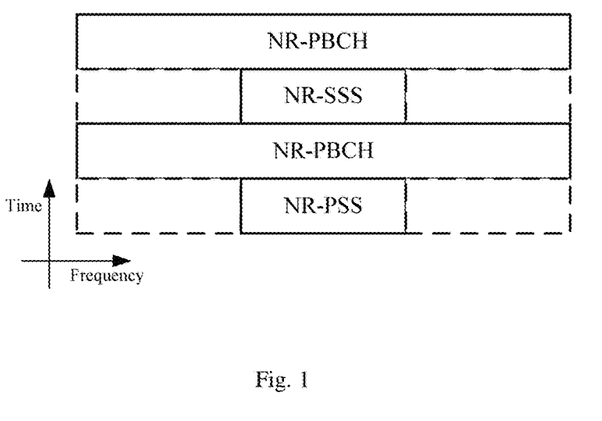
FIG. 1 is a diagram showing an illustration of the SSB.

A synchronization signal block (SSB) as proposed for the NR system may comprise the above signals NR-PSS, NR-SSS, NR-PBCH and related DMRS. FIG. 1 shows an illustration of the SSB in which the NR-PBCH is a part of the SSB. In the illustration, two OFDM symbols are reserved for NR-PBCH transmission. The NR-PSS and NR-SSS are defined to be 127 subcarriers wide whereas the NR-PBCH is defined to be 288 subcarriers wide.

A number of SS blocks that are typically close in time constitute an SS burst set. The SS burst set may be repeated periodically, e.g. every 20 ms in default. The terminal device can, by using the SS blocks in the SS burst set, determine downlink timing and frequency offset, and acquire some fundamental system information from the NR-PBCH. It has been agreed that an NR UE in idle mode can expect an SS burst set transmitted once per 20 ms, and the NR UE in connected mode can expect the SS burst sets once per 5 ms. Hence, once the NR UE has obtained downlink synchronization, it knows in which slots to expect the SS block transmissions. The location of the SS block in a SS burst set needs to be provided to the NR UE to derive the subframe level synchronization.

SUMMARY

It is therefore an object of embodiments of the present disclosure to provide a method for synchronization in a wireless system which can indicate the location of the SS block in the SS burst set as well as additional system information.

According to a first aspect of the disclosure, there is provided a method performed in a base station for synchronization in a wireless system. The method comprises transmitting a physical broadcast channel (PBCH) including one or more bits. The one or more bits indicates a location of a slot group comprising at least one synchronization signal block in a synchronization signal burst set and/or additional system information. In particular, the one or more bits indicate additional system information if a frequency of the wireless system is within a frequency range up to a predefined frequency e.g. 6 GHz. Otherwise, i.e. if the frequency of the wireless system is above the predefined frequency, the one or more bits indicate the location of the slot group comprising at least one synchronization signal block in the synchronization signal burst set including the slot group.

In some embodiments, the PBCH may be interleaved with a downlink pilot signal sequence which carries one or more bits indicating a location of the at least one synchronization signal block within the slot group.

In some embodiments, the additional system information comprises at least one of: a frame number offset of a coexisting system relative to the wireless system, system information of a neighbor cell in the coexisting system, configuration information of the synchronization signal burst set of a neighbor cell in the wireless system, and an indication related to synchronization information in the wireless system.

In some embodiments, the system information of a neighbor cell in the coexisting system comprises an identifier of the neighbor cell.

In some embodiments, the configuration information of the synchronization signal burst set of a neighbor cell in the NR system comprises the number of the synchronization signal blocks actually transmitted in the neighbor cell and periodicity of the synchronization signal burst set.

According to a second aspect of the disclosure, there is provided a base station in a wireless system. The base station comprises a processor, and a memory. The memory contains instructions executable by the processor, whereby the base station is operative to perform the method according to the first aspect of the disclosure.

According to a third aspect of the disclosure, there is provided a computer readable storage medium having a computer program stored thereon. The computer program is executable by a base station to cause the base station to carry out the above method for synchronization in a wireless system according to the first aspect of the disclosure.

According to a fourth aspect of the disclosure, there is provided a method performed in a terminal device for synchronization in a wireless system. The method comprises receiving a PBCH including one or more bits from a base station. The one or more bits indicate a location of a slot group comprising at least one synchronization signal block in a synchronization signal burst set and/or additional system information. Then the location of the slot group in the synchronization signal burst set and/or the additional system information are obtained from the one or more bits. In particular, the one or more bits indicate the additional system information if a frequency of the wireless system is within a frequency range up to a predefined frequency, e.g. 6 GHz. Otherwise, if the frequency of the wireless system is above the predefined frequency, the one or more bits indicate the location of the slot group comprising at least one synchronization signal block in the synchronization signal burst set including the slot group.

According to a fifth aspect of the disclosure, there is provided a terminal device in a wireless system. The terminal device comprises a processor and a memory. The memory contains instructions executable by the processor, whereby the terminal device is operative to perform the method for synchronization according to the fourth aspect of the disclosure.

It is an advantage that the method for synchronization can indicate the locations of the SS blocks as well as the additional system information in the PBCH, especially in the NR-PBCH, thereby greatly reducing network detection of a terminal device.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 2:
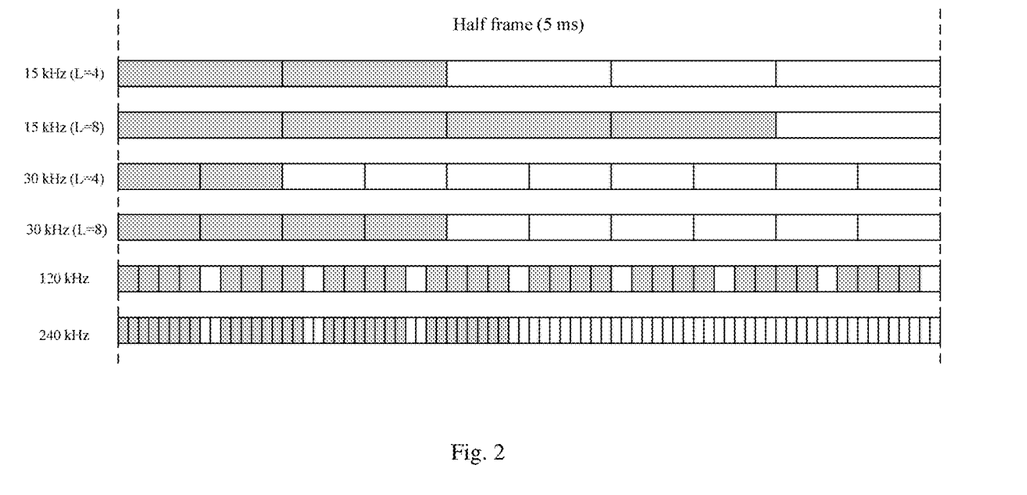
FIG. 2 is a diagram illustrating the SS burst set.

Currently in 3GPP, it has been agreed that the transmission of the SS blocks within the SS burst set is confined to a 5 ms window regardless of a periodicity of the SS burst set. Within this 5 ms window, the number of locations of possible candidate SS blocks is L. Therefore the maximum number of the SS blocks within the SS burst set L is different for different frequency ranges. For a frequency range up to 3 GHz (i.e. ≤3 GHz), L is 4. For a frequency range from 3 GHz to 6 GHz (i.e. 3 GHz<the frequency≤3 GHz), L is 8. For a frequency range from 6 GHz to 52.6 GHz (i.e. 6 GHz<the frequency≤52.6 GHz), L is 64. Note that it is assumed that the minimum number of the SS blocks within each SS burst set is one to define performance requirements. The SS burst set is as shown in FIG. 2. The blocks with a gray scale represents the slots for transmitting the SS blocks. "15 kHz", "30 kHz", "120 kHz" and "240 kHz" as shown in FIG. 2 refer to the subcarrier spacing.

Further it has been agreed that some bits of a SS block time index which indicates the locations of the SS blocks are carried by changing the DMRS sequence within each 5 ms period. Scrambling sequence of the PBCH may or may not carry a part of timing information. The remaining bits of the SS block time index may be carried explicitly in the NR-PBCH payload. Therefore, it has been agreed to deliver the SS block time index by the NR-PBCH transmission using an implicit approach by the DMRS sequence and explicit bits in the NR-PBCH payload.

There are following problems to indicate the SS block time index by this way:

1. The total numbers of bits of the SS block time index are different for different frequency ranges;

2. The NR-PBCH payload size should be defined and constant for all frequency ranges;

3. There will be different requirements on the number of the explicit bits in the NR-PBCH payload for different frequency ranges.

In summary, the number of the explicit bits for the higher frequency range would be larger than that for the lower frequency range.

Figure 3:
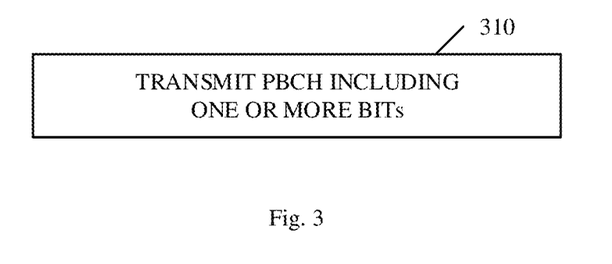
FIG. 3 is a diagram illustrating the method for synchronization according to some embodiments of the present disclosure.

In view of the above problems, a new method for synchronization in a wireless system is proposed. FIG. 3 shows a diagram illustrating the method for synchronization according to some embodiments of the present disclosure. In some embodiments of the present disclosure, the method may be performed by a network device in the wireless system. The wireless system may be for example the NR system, and the network device may be a base station, e.g. gNodeB, in the NR system.

As shown in FIG. 3, at block 310, the network device may include at least one bit in the PBCH, particularly the NR-PBCH in the NR system. One or more bits of the at least one bit may indicate a location of a slot group comprising at least one SS block in a SS burst set and/or additional system information. In particular, the network device transmits the PBCH including the one or more bits to a terminal device. The one or more bits indicate the additional system information if a frequency of the wireless system is within a frequency range up to a predefined frequency, e.g. 6 GHz. Otherwise, if the frequency is above the predefined frequency, the one or more bits indicate the location of the slot group comprising the at least one SS block in the synchronization signal burst set including the slot group.

In some embodiments, one or more bits of the at least one bit may indicate a location of the at least one SS block within the slot group. In such embodiments, the one or more bits may be carried by different downlink pilot signal sequences, e.g. the DMRS sequences.

As described above, the SS burst set may comprise multiple SS blocks. For the frequency range up to 3 GHz, the SS burst set may comprise 4 SS blocks. For the frequency range from 3 GHz to 6 GHz, the SS burst set may comprise 8 SS blocks. For the frequency range from 6 GHz to 52.6 GHz, the SS burst set may comprise 64 SS blocks. In some embodiments, it is assumed that a slot group comprises continuous four slots for the frequency range from 3 GHz and comprises continuous 2 slots for the frequency range up to 3 GHz, and that each slot may contain at most two SS blocks, for example. Therefore, for the frequency range up to 3 GHz, the SS burst set may comprise one slot group, and each slot of the one slot group comprises 2 SS blocks, so the SS burst set comprises 4 SS blocks (i.e. L=4). For the frequency range from 3 GHz to 6 GHz, the SS burst set may comprise one slot group and each slot of the slot group may comprise 2 SS blocks, so the SS burst set comprises 8 SS blocks (i.e. L=8). For the frequency range from 6 GHz to 52.6 GHz, the SS burst set may comprise eight slot groups, and each of the eight slot groups may comprise 8 SS blocks, so the SS burst set comprises 64 SS blocks (i.e. L=64). A person skilled in the art will appreciate that the slot group may be consisted of any other number of slots.

Figure 4:
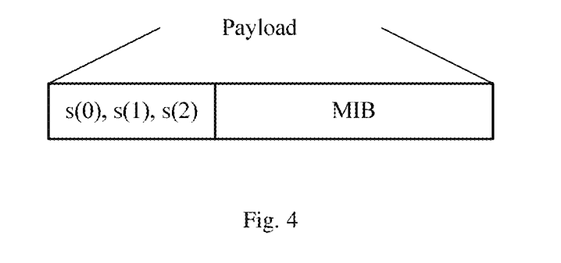
FIG. 4 is a diagram illustrating an example of payload of the NR-PBCH according to some embodiment of the present disclosure.

Next an example in which the method for synchronization is implemented for all frequency ranges will be described in detail. This example is applied in the NR system. In this example, the NR-PBCH may include 6 bits indicative of the locations of the SS blocks in the SS burst set. Three bits of the 6 bits may be used to indicate the location of the slot group in the SS burst set and/or additional system information, and may be included in a payload of the NR-PBCH. In the following, the bits in the payload of the NR-PBCH may be also referred to as "explicit bits". The other 3 bits may be used to indicate the locations of the SS blocks within the slot group, and may be carried by the DMRS sequences. Referring to FIG. 4, three explicit bits s(0), s(1), s(2) to indicate the location of the slot group and/or the additional system information are attached with MIB (Master Information Block) from higher layer and L1 payload to constitute the payload of the NR-PBCH.

In the case of the frequency range less than 6 GHz, the maximum number of the SS blocks in the SS burst set is eight. So the locations of the SS blocks may be indicated by using the DMRS sequence only. The remaining 3 explicit bits may be used to indicate the additional system information, which will be described later.

Figure 5:
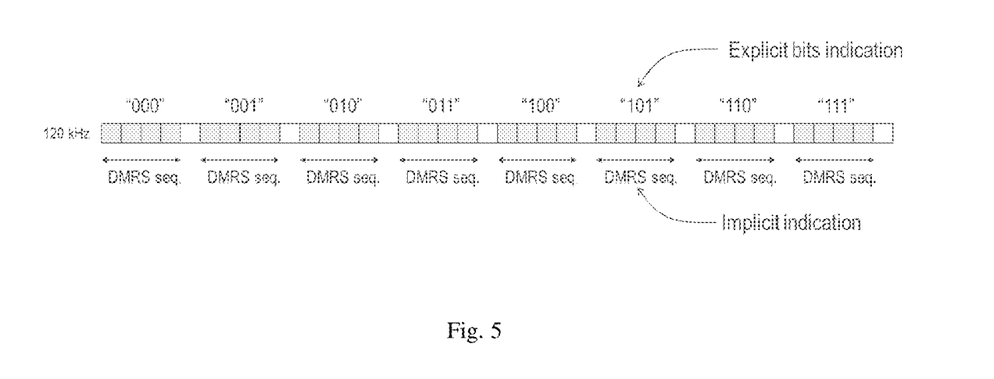
FIG. 5 is a diagram illustrating an example of the indication of the locations of the SS blocks according to some embodiments of the present disclosure.

In the case of the frequency range higher than 6 GHz, the maximum number of the SS blocks in the SS burst set is 64. All the six bits are used to indicate the locations of the SS blocks. In this case, the three explicit bits in the payload of the NR-PBCH may indicate the locations of the eight slot groups, and the three bits carried by the different DMRS sequences may implicitly indicate the locations of the eight SS blocks within the slot group, as shown in FIG. 5.

Although the example in which the bits carried by the DMRS sequences are 3 bits and the explicit bits in the payload of the NR-PBCH are 3 bits has been described above, a person skilled in the art will appreciate that the bits carried by the DMRS sequences may be 2 bits and the explicit bits in the payload of the NR-PBCH may be 4 bits.

In addition, a person skilled in the art will also appreciate that the number of bits in the NR-PBCH may be more than 6 bits. In this case, the bits other than those indicative of the locations of the SS blocks may indicate the additional system information.

In some embodiments, the bits carried by the DMRS sequences may indicate the location of a slot group comprising at least one SS block in a SS burst set, and the explicit bits in the payload of the NR-PBCH may indicate the location of the SS block within the slot group and/or the additional system information.

Figure 6:
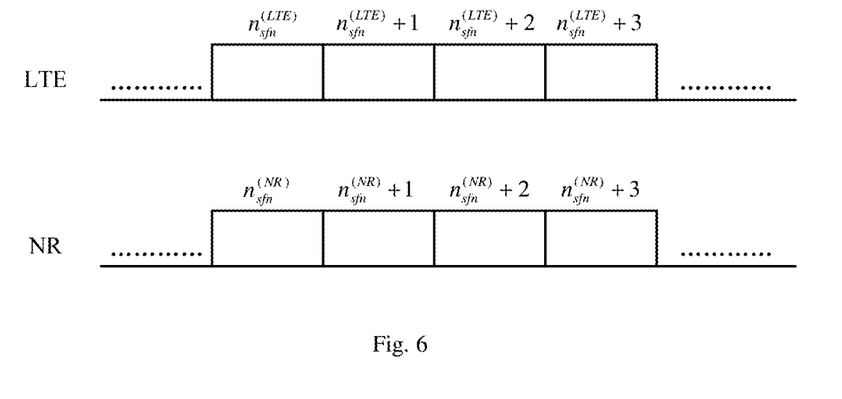
FIG. 6 is a diagram illustrating the system frame number offset in the coexistence of the NR system and LTE system.

In some embodiments, the additional system information may comprise a frame number offset of a coexisting system relative to the wireless system. In the case that the wireless system is the NR system, the coexisting system may be the LTE system. In the two systems, the frame durations are defined as 10 ms, and may have different frame number as illustrated in FIG. 6. In FIG. 6, the frame number in the LTE system is denoted by $n_{sfn}^{(LTE)}$, and the frame number in the NR system in the same time duration is denoted by $n_{sfn}^{(NR)}$. Since almost all the data transmissions, especially the system information, are based on the frame number, the exact frame number will make much more sense for a terminal device such as NR user equipment. Thus, the frame number offset between the two systems, i.e. $n_{sfn}^{(NR)} - n_{sfn}^{(LTE)}$ may be indicated by the explicit bits. Dependent on the number of the explicit bits, the frame number offset is within a range, such as 8 frames for three explicit bits, and more frames for more explicit bits.

In some embodiments, the additional system information may comprise system information of a neighbor cell in the coexisting system. Such the system information may comprise an identifier of the neighbor cell, e.g. a target cell.

In the LTE system, there are 504 unique physical-layer cell identities. The physical-layer cell identities may be grouped into 168 unique physical-layer cell-identity groups, each group containing three unique identities. The grouping is such that each physical-layer cell identity is a part of one and only one physical-layer cell-identity group. Thus a physical-layer cell identity may be uniquely defined by $N_{ID}^{cell} = 3N_{ID}^{(1)} + N_{ID}^{(2)}$, wherein the number $N_{ID}^{(1)}$ is in the range of 0 to 167, representing the physical-layer cell-identity group, and the number $N_{ID}^{(2)}$ is in the range of 0 to 2, representing the physical-layer identity within the physical-layer cell-identity group.

In this case, the three explicit bits can be used to indicate presence of one or more neighbor cells of the coexisting LTE system, with the physical-layer identity 0, 1 or 2 within the physical-layer cell-identity group in the neighborhood (coverage area) of the current serving cell as shown in Table 1.

TABLE 1

| Explicit Bits | $N_{ID}^{(2)}$ of neighbor cell(s) |
| --- | --- |
| 000 | No LTE system coexisting |
| 001 | {0} |
| 010 | {1} |
| 100 | {2} |
| 011 | {0, 1} |
| 101 | {0, 2} |
| 110 | {1, 2} |
| 111 | {0, 1, 2} |

In some embodiments, the additional system information may comprise configuration information of the SS burst set of a neighbor cell in the wireless system. For example, such configuration information may comprise the number of the synchronization signal blocks actually transmitted in the neighbor cell and periodicity of the synchronization signal burst set.

In the case of the frequency range less than 6 GHz, the maximum number L of the SS blocks is 8 or 4, and the candidate locations for the actual SS block(s) transmission need to be pre-defined as a set to avoid arbitrary allocation.

For example, the locations may be defined as the continuous N (N≤L) blocks in the SS burst set, such that there are only 2, 3 and 6 (for the frequency range higher than 6 GHz) bits needed for all the three frequency ranges.

Therefore three explicit bits may be defined as below to indicate the number of actual transmitted SS blocks for one NR neighbor cell (if existed) with maximum number of actual transmitted SS blocks among all the neighbor NR cell(s) or the number of actual transmitted SS blocks of a neighbor cell as the target cell:

"000" indicates the maximum 1 SS block in the cell(s) is actually transmitted;

"001" indicates the maximum 2 SS blocks in the cell(s) are actually transmitted;

"010" indicates the maximum 3 SS blocks in the cell(s) are actually transmitted;

"100" indicates the maximum 4 SS blocks in the cell(s) are actually transmitted;

"011" indicates the maximum 5 SS blocks in the cell(s) are actually transmitted;

"101" indicates the maximum 6 SS blocks in the cell(s) are actually transmitted;

"110" indicates the maximum 7 SS blocks in the cell(s) are actually transmitted; and "111" indicates the maximum 8 SS blocks in the cell(s) are actually transmitted.

In some embodiments, the additional system information may comprise an indication related to synchronization information in the wireless system. In addition, a person skilled in the art will appreciate that the additional system information may be any combination of the above described system information.

It can be seen from the above description that the method for synchronization according to the above embodiments can indicate the locations of the SS blocks as well as the additional system information in the NR-PBCH. Moreover the same number of the explicit bits may be used for all the frequency ranges for the wireless system, especially the NR system. The explicit bits can be used to indicate the additional system information, other than indicating the part of the locations.

Figure 7:
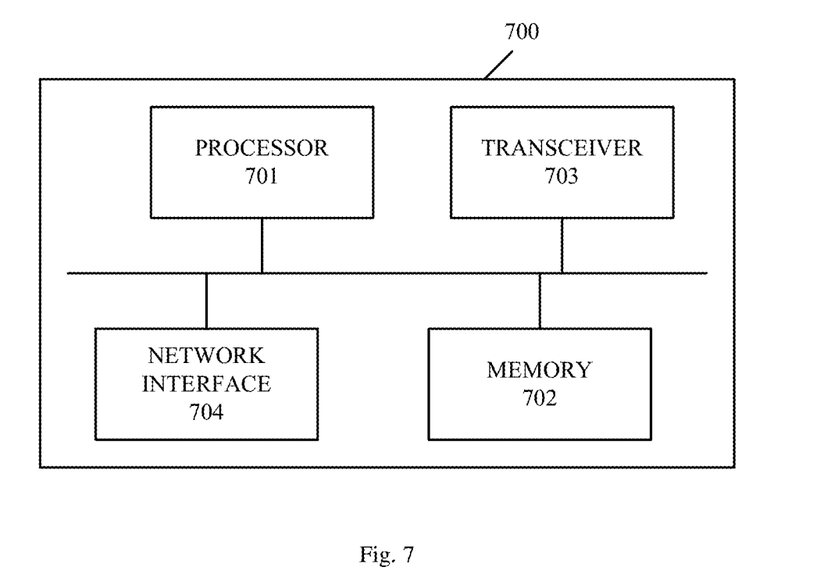
FIG. 7 is a schematic block diagram of a network device according to some embodiments of the present disclosure.

FIG. 7 is a schematic block diagram of the network device 700 according to some embodiments of the present disclosure. The network device 700 may be a base station in the wireless system, e.g. gNodeB in the NR system. As shown in FIG. 7, the network device 700 may comprise a processor 701 and a memory 702. The memory 702 may contain instructions executable by the processor 701. The network device 700 is operative to include at least one bit in a PBCH, one or more bits of the at least one bit indicating a location of a slot group comprising at least one synchronization signal block in a synchronization signal burst set and/or additional system information. In particular, the network device 700 is operative to transmit the PBCH including the one or more bits. The one or more bits indicate the additional system information if a frequency of the wireless system is within a frequency range up to a predefined frequency, e.g. 6 GHz. Otherwise if the frequency of the wireless system is above the predefined frequency, the one or more bits indicate the location of the slot group comprising the at least one SS block in the SS burst set including the slot group.

The processor 701 may be of any type suitable to the local technical environment, and may comprise one or more of general purpose computers, special purpose computers, microprocessors, digital signal processors (DSPs) and processors based on multi-core processor architectures, as non-limiting examples. The memory 702 may be of any type suitable to the local technical environment and may be implemented using any suitable data storage technology, such as semiconductor based memory devices, flash memory, magnetic memory devices and systems, optical memory devices and systems, fixed memory and removable memory.

In some embodiments, the network device 700 may further comprise a transceiver 703 operative to transmit signals to and receive signals from a wireless terminal, and a network interface 704 operative to communicate signals with backend network elements.

Figure 8:
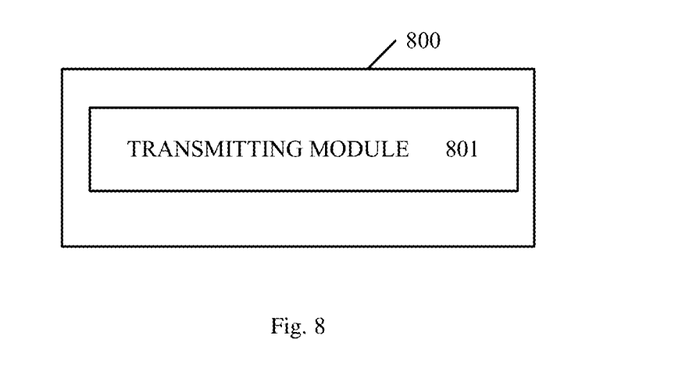
FIG. 8 is a schematic block diagram of a network device according to some embodiments of the present disclosure.

According to some embodiments of the present disclosure, a network device 800 for synchronization is provided. As shown in FIG. 8, the network device 800 may be a base station, e.g. gNodeB, in the NR system. The network device may comprise a transmitting module 801 operable to include at least one bit in a physical broadcast channel (PBCH), one or more bits of the at least one bit indicating a location of a slot group comprising at least one synchronization signal block in a synchronization signal burst set and/or additional system information.

It should be noted that FIG. 8 merely illustrates various functional modules in the network device 800, and a person skilled in the art can implement these functional modules in practice using any suitable software and hardware. Thus the embodiments herein are generally not limited to the shown structure of the network device 800 and functional modules.

In some embodiments of the present disclosure, there is also provided a computer readable storage medium having a computer program stored thereon. The computer program is executable by a device to cause the device to carry out the above method for synchronization.

Figure 9:
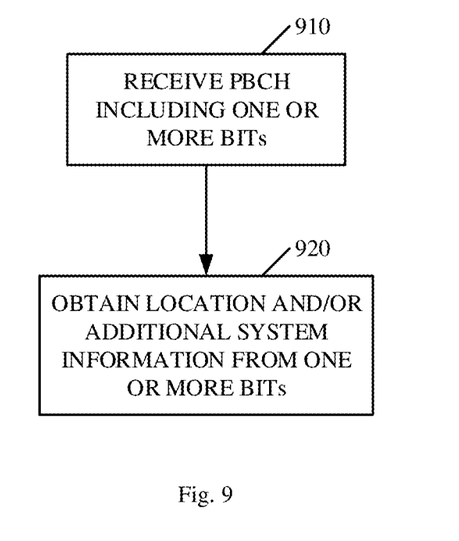
FIG. 9 is a diagram illustrating the method for synchronization according to some embodiments of the present disclosure.

According to some embodiments of the present disclosure, a method performed in a terminal device for synchronization in a wireless system is further provided. As shown in FIG. 9, at block 910, at least one bit in a PBCH is received from a network device. One or more bits of the at least one bit indicates a location of a slot group comprising at least one synchronization signal block in a synchronization signal burst set and/or additional system information. In particular, the terminal device receives the PBCH including the one or more bits from a base station. The one or more bits indicate additional system information if a frequency of the wireless system is within a frequency range up to a predefined frequency e.g. 6 GHz. Otherwise, if the frequency of the wireless system is above the predefined frequency, the one or more bits indicate the location of the slot group comprising the at least one SS block in the SS burst set including the slot group. Then at block 920, the location of the slot group in the synchronization signal burst set and/or the additional system information are obtained from the at least one bit.

In some embodiments, one or more bits of the at least one bit indicate a location of the at least one synchronization signal block within the slot group. In the method, the location of the at least one synchronization signal block within the slot group are obtained from the one or more bits.

In some embodiments, the wireless system is a NR system.

Figure 10:
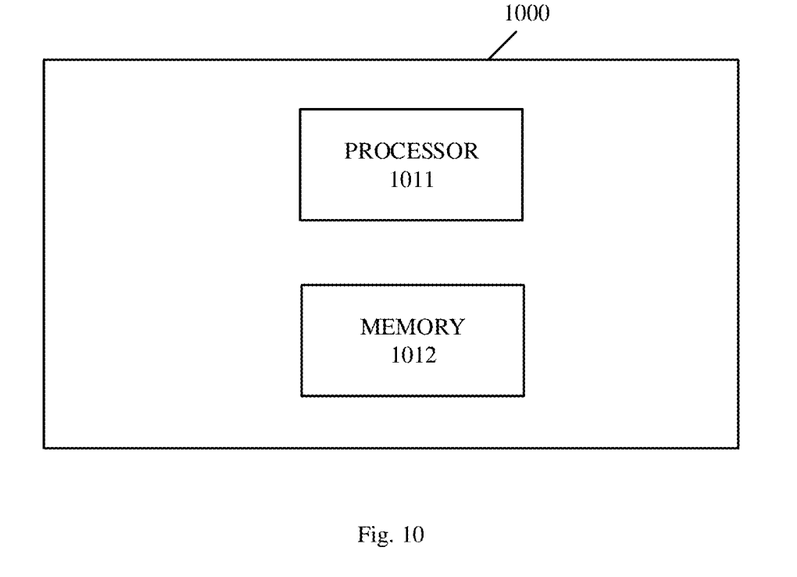
FIG. 10 is a schematic block diagram of a terminal device according to some embodiments of the present disclosure.

According to some embodiments of the disclosure, a terminal device 1000 in a wireless system is further provided. As shown in FIG. 10, the terminal device 1000 comprises a processor 1011, and a memory 1012. The memory 1012 contains instructions executable by the processor 1011, whereby the terminal device is operative to perform the method for synchronization as described with regard to FIG. 9. The terminal device 1000 may be a radio device, such as a mobile phone, a wearable device, a tablet, etc., a vehicle with radio communication functionality, or any other type of electronic device with radio communication functionality.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure comprises any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method in a base station for synchronization in a wireless system comprising:
    transmitting a physical broadcast channel (PBCH) including one or more bits, wherein the one or more bits indicate additional system information when a frequency of the wireless system is within a frequency range up to a predefined frequency and indicate a location of a slot group in a synchronization signal burst set when the frequency of the wireless system is above the predefined frequency, wherein the slot group comprises at least one synchronization signal block and the synchronization signal burst set includes the slot group.

2. The method according to claim 1 wherein the PBCH is interleaved with a downlink pilot signal sequence which carries one or more bits indicating a location of the at least one synchronization signal block within the slot group.

3. The method according to claim 1, wherein the additional system information comprises a frame number offset of a coexisting system relative to the wireless system.

4. The method according to claim 1, wherein the additional system information comprises system information of a neighbor cell in a coexisting system.

5. The method according to claim 4 wherein the system information of a neighbor cell in the coexisting system comprises an identifier of the neighbor cell.

6. The method according to claim 1, wherein the additional system information comprises configuration information of a synchronization signal burst set of a neighbor cell in the wireless system, and an indication related to synchronization information in the wireless system.

7. The method according to claim 6 wherein the configuration information of the synchronization signal burst set of the neighbor cell in the wireless system comprises a number of the synchronization signal blocks actually transmitted in the neighbor cell and periodicity of the synchronization signal burst set.

8. The method according to claim 1 wherein the one or more bits are included in a payload of the PBCH and wherein the one or more bits are the most significant bits of the payload.

9. The method according to claim 1 wherein the predefined frequency is 6 GHz.

10. A base station in a wireless system comprising:
    a processor; and
    a memory, the memory containing instructions which, when executed by the processor, are capable of causing the base station to:
        transmit a physical broadcast channel (PBCH) including one or more bits, wherein the one or more bits indicate additional system information when a frequency of the wireless system is within a frequency range up to a predefined frequency and indicate a location of a slot group in a synchronization signal burst set when the frequency of the wireless system is above the predefined frequency, wherein the slot group comprises at least one synchronization signal block and the synchronization signal burst set includes the slot group.

11. The base station according to claim 10, wherein the PBCH is interleaved with a downlink pilot signal sequence which carries one or more bits indicating a location of the at least one synchronization signal block within the slot group.

12. A method in a terminal device for synchronization in a wireless system comprising:
    receiving a physical broadcast channel (PBCH) including one or more bits from a base station, wherein the one or more bits indicate additional system information when a frequency of the wireless system is within a frequency range up to a predefined frequency and indicate a location of a slot group in a synchronization signal burst set when the frequency of the wireless system is above the predefined frequency, wherein the slot group comprises at least one synchronization signal block and the synchronization signal burst set includes the slot group.

13. The method according to claim 12, wherein the PBCH is interleaved with a downlink pilot signal sequence carrying one or more bits indicating a location of the at least one synchronization signal block within the slot group.

14. The method according to claim 12, wherein the additional system information comprises a frame number offset of a coexisting system relative to the wireless system.

15. The method according to claim 12 wherein the additional system information comprises system information of a neighbor cell in a coexisting system.

16. The method according to claim 15 wherein the system information of a neighbor cell in the coexisting system comprises an identifier of the neighbor cell.

17. The method according to claim 12 wherein the additional system information comprises configuration information of the synchronization signal burst set of a neighbor cell in the wireless system.

18. The method according to claim 17 wherein the configuration information of the synchronization signal burst set of a neighbor cell in the wireless system comprises a number of the synchronization signal blocks actually transmitted in the neighbor cell and periodicity of the synchronization signal burst set.

19. The method according to claim 12, wherein the additional system information comprises an indication related to synchronization information in the wireless system.

20. The method according to claim 12 wherein the one or more bits are included in a payload of the PBCH and wherein the one or more bits are the most significant bits of the payload.

21. The method according to claim 12 wherein the predefined frequency is 6 GHz.

22. A terminal device in a wireless system comprising:
a processor; and
a memory, the memory containing instructions which, when executed by the processor, are capable of causing the terminal device to:
receive a physical broadcast channel (PBCH) including one or more bits from a base station, wherein the one or more bits indicate additional system information when a frequency of the wireless system is within a frequency range up to a predefined frequency and indicate a location of a slot group in a synchronization signal burst set when the frequency of the wireless system is above the predefined frequency, wherein the slot group comprises at least one synchronization signal block and the synchronization signal burst set includes the slot group.

23. The terminal device according to claim 22, wherein the PBCH is interleaved with a downlink pilot signal sequence carrying one or more bits indicating a location of the at least one synchronization signal block within the slot group.

* * * * *

UNITED STATES PATENT AND TRADEMARK OFFICE
CERTIFICATE OF CORRECTION

Page 1 of 1

PATENT NO. : 10,887,853 B2
APPLICATION NO. : 16/453658
DATED : January 5, 2021
INVENTOR(S) : Wang et al.

It is certified that error appears in the above-identified patent and that said Letters Patent is hereby corrected as shown below:

In the Specification

In Column 1, Line 8, delete "2018," and insert -- 2018, now Pat. No. 10,477,499, --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*